(12) United States Patent
Van Phan et al.

(10) Patent No.: US 8,897,262 B2
(45) Date of Patent: Nov. 25, 2014

(54) RELAYING IN A COMMUNICATION SYSTEM

(75) Inventors: Vinh Van Phan, Oulu (FI); Ling Yu, Oulu (FI); Kari Veikko Horneman, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 181 days.

(21) Appl. No.: 13/634,348

(22) PCT Filed: Mar. 12, 2010

(86) PCT No.: PCT/EP2010/053221
§ 371 (c)(1),
(2), (4) Date: Oct. 5, 2012

(87) PCT Pub. No.: WO2011/110229
PCT Pub. Date: Sep. 15, 2011

(65) Prior Publication Data
US 2013/0051309 A1 Feb. 28, 2013

(51) Int. Cl.
*H04W 4/00* (2009.01)
*H04W 36/00* (2009.01)
*H04B 7/155* (2006.01)
*H04B 7/26* (2006.01)
*H04W 84/04* (2009.01)
*H04W 84/22* (2009.01)

(52) U.S. Cl.
CPC ....... *H04W 36/0055* (2013.01); *H04B 7/15592* (2013.01); *H04B 7/2606* (2013.01); *H04W 84/047* (2013.01); *H04W 84/22* (2013.01)
USPC ...................... 370/331; 370/310.2

(58) Field of Classification Search
CPC ................. H04L 2012/5608; H04W 84/12
USPC ................. 370/310.2, 328, 338, 349, 331
See application file for complete search history.

(56) References Cited

U.S. PATENT DOCUMENTS

| | | | |
|---|---|---|---|
| 6,591,104 B2 * | 7/2003 | Ohtani et al. | 455/436 |
| 7,590,064 B1 | 9/2009 | Zhang et al. | 370/235 |
| 2005/0094608 A1 | 5/2005 | Yokota | 370/338 |
| 2008/0165776 A1 * | 7/2008 | Tao et al. | 370/392 |
| 2010/0061339 A1 | 3/2010 | Kim et al. | 370/331 |
| 2011/0134826 A1 * | 6/2011 | Yang et al. | 370/315 |

FOREIGN PATENT DOCUMENTS

WO    WO 2008/084394 A2    7/2008

\* cited by examiner

*Primary Examiner* — Brenda H Pham
(74) *Attorney, Agent, or Firm* — Harrington & Smith

(57) ABSTRACT

A method and apparatus for relaying communications between a mobile device and a network access node is disclosed. In the method a connection is established between a first relay node of a group of relay nodes and the network access node to serve the mobile device. The mobile device is served by the first relay node and at least one second relay node of the group in wireless connection with the mobile device such that the mobile device remains connected to the network access node via at least one of the first and second relay nodes when one of the first and second relay nodes changes. To maintain the relayed communications for the mobile device after the change in the relay nodes control information is communicated by at least one of said relay nodes on an interface between relevant relay nodes in the group.

28 Claims, 3 Drawing Sheets

RELAYING IN A COMMUNICATION SYSTEM

This disclosure relates to relaying of communications by a mobile device in a communication system.

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. Examples of wireless systems include public land mobile networks (PLMN), satellite based communication systems and different wireless local networks, for example wireless local area networks (WLAN). In wireless systems an access node is provided by a base station. The radio coverage area of a base station is known as a cell, and therefore the wireless systems are often referred to as cellular systems. In some systems a base station access node is called Node B.

A user can access the communication system by means of an appropriate communication device. A communication device of a user is often referred to as user equipment (UE). A communication device is provided with an appropriate signal receiving and transmitting arrangement for enabling communications with other parties. A communication device may be arranged to communicate, for example, data for carrying communications such as voice, electronic mail (email), text message, multimedia, for enabling internet access and so on.

Users may thus be offered and provided numerous services via their communication devices. The communication connection can be provided by means of one or more data bearers.

In wireless systems a communication device provides a transceiver station that can communicate with the access node and/or another communications device. A communication device or user equipment may also be considered as being a part of a communication system. In certain applications, for example in ad-hoc networks, the communication system can be based on use of a plurality of user equipment capable of communicating with each other.

A feature of wireless communication devices is that they offer mobility for the users thereof. A mobile communication device, or mobile device for short, may also be transferred, or handed over, from a base station to another and even between base stations belonging to different systems.

$3^{rd}$ Generation Partnership Project (3GPP) is standardizing an architecture that is known as the long-term evolution (LTE) of the Universal Mobile Telecommunications System (UMTS) radio-access technology. The aim is to achieve, inter alia, reduced latency, higher user data rates, improved system capacity and coverage, and reduced cost for the operator. A further development of the LTE is referred to herein as LTE-Advanced. The LTE-Advanced aims to provide further enhanced services by means of even higher data rates and lower latency with reduced cost. The various development stages of the 3GPP LTE specifications are referred to as releases.

An aspect of controlling communications by mobile devices is known as mobility management. Mobility management provides control of active mobile devices moving within a certain area. In cellular systems mobility management is provided by a particular control entity. For example, in the LTE each access system is provided with a mobility management entity (MME). A MME control node is involved, inter alia, in idle mode user equipment tracking and paging procedures including retransmissions, in bearer activation/deactivation processes and in choosing a signalling gateway (SGW) for a user equipment at the initial attach and at time of intra-LTE handover involving core network (CN) node relocation.

Since the new spectrum bands for international mobile telecommunications (IMT) contain higher frequency bands and LTE-Advanced is aiming at a higher data rate, coverage of one base station may be limited due to the high propagation loss and limited energy per bit. Relaying has been proposed as a possibility to enlarge the coverage. Apart from this goal of coverage extension, introducing relay concepts may also help in the provision of high-bit-rate coverage in a high shadowing environment, reducing average radio-transmission power at the user equipment. This may provide improved battery life, enhanced cell capacity and effective throughput. Relaying may also reduce deployment costs of radio access networks (RAN).

Relaying would typically be provided by entities referred to as relay stations (RSs) or relay nodes (RNs). The relay nodes can be fixed or mobile, for example mounted to a high-speed train. In some systems the relay stations may be opportunistically available user equipment/mobile devices that are not owned by the network itself. Relay nodes may be organised into groups, for example into a co-operative cell group (CCG).

A mobile device may be transferred from a relay node to another inside the coverage area of a co-operative cell group. This can be provided, for example, by means of inter-cell handover (HO) procedure between neighbouring relay node cells of a co-operative cell group. However, applying for example the current LTE Release 8 handover procedures as such for handover between two relay nodes can require a considerable amount of signalling for data and context exchanges between the involved relay nodes, donor eNBs and mobility management entities MME(s) of the access network (s). A connection and bearer setup may also be required.

Embodiments of the invention aim to address one or several of the above issues.

In accordance with an embodiment there is provided a method for relaying communications between a mobile device and a network access node, comprising establishing a connection between a first relay node of a group of relay nodes and the network access node to serve the mobile device, serving the mobile device by the first relay node and at least one second relay node of the group in wireless connection with the mobile device such that the mobile device remains connected to the network access node via at least one of the first and second relay nodes when one of the first and second relay nodes changes, and communicating control information by at least one of said relay nodes on an interface between relevant relay nodes in the group to maintain the relayed communications for the mobile device after the change in the relay nodes.

In accordance with another embodiment there is provided a method for relaying communications between a mobile device and a network access node, comprising providing a group of relay nodes with a group identity, establishing a connection between a relay node of the group and the network access node based on the group identity, maintaining information of active mobile devices in the group, and providing relayed communications for the mobile device by the relay node and at least one second relay node of the group based on the information of active mobile devices and control information communicated on an interface between the relevant relay nodes in the group.

In accordance with another embodiment there is provided an apparatus for a relay node in communication system where communications between a mobile device and a network access node is relayed by at least two relay nodes of a group of relay nodes, the apparatus comprising at least one processor, and at least one memory including computer program code, wherein the at least one memory and the computer program code are configured, with the at least one processor, to control a connection established between a first relay node of a group of relay nodes and the network access node and a connection within the group to a second relay node of the group such that the mobile device remains connected to the network access node via a connection involving at least one of the first relay node and the second relay node when one of the first and second relay nodes changes.

In accordance with yet another embodiment there is provided an apparatus for a relay node in a communication system where communications between a mobile device and a network access node is relayed by at least two relay nodes of a group of relay nodes, the apparatus comprising at least one processor, and at least one memory including computer program code, wherein the at least one memory and the computer program code are configured, with the at least one processor, to provide mobility management for the mobile device within the group such that the mobile device remains connected to the network access node via a first relay node when the mobile device is handed over to another relay node in the group.

In accordance with a more detailed embodiment the connection between the network access node and the first relay node is maintained when the mobile device is handed over to or from the second relay node. A wireless connection between the second relay node and the mobile device can be maintained when the connection between the network access node and the first relay node is handed over to another relay node. The change may comprise intra-group handover of the mobile device from a second relay node to a third relay node.

Mobility management may be provided for the mobile device within a co-operative group of relay nodes independently from mobility management control by the network. Radio-link level handover control may be provided by at least one of the relay nodes.

A termination point of a backhauling link between the first relay node and the network access node may be maintained at the first relay node when a second relay node serving the mobile device changes.

The control information may comprise identity of the first relay node.

Establishing the connection may comprises configuration of a bearer context for the mobile device. The relevant relay nodes may transfer, map and/or maintain the bearer context after the change.

The control of the mobile device by the serving relay nodes may be controlled by the first relay node.

Unique identities for bearer context of mobile devices may be provided in a group of relay nodes. An identity for the group may also be provided. The group can be addressed as a whole based on the group identity.

A record of active mobile devices may be maintained in at least one relay node of the group.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are described in the following detailed description and in the attached claims.

For a better understanding of some embodiments of the invention, reference will be made by way of example only to the accompanying drawings in which.

In the following certain exemplifying embodiments are explained with reference to wireless or mobile communication systems serving mobile communication devices. Before explaining in detail the certain exemplifying embodiments, certain general principles of a wireless communication system and the nodes thereof are briefly explained with reference to FIGS. 1 and 2 to assist in understanding of the herein described embodiments.

Figure 1:
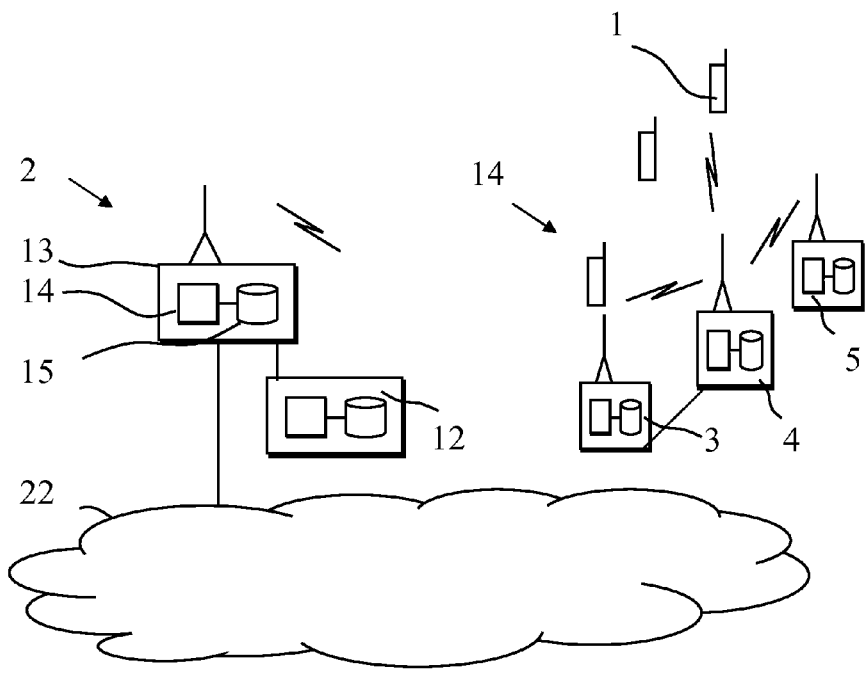
FIG. 1 shows a cell with three relay nodes.

In a mobile system a user can be provided with a mobile communication device 1 that can be used for accessing various services and/or applications. The access can be provided via an access interface between the mobile user device 1 and an appropriate wireless access system, for example an access node. An access node can be provided by a base station. FIG. 1 shows part of a radio access network (RAN), including a base station 2. The term base station will be used in the following and is intended to include the use of any of these access nodes or any other suitable access node. The base station 2 has a cell associated therewith. In the cell area, there is provided three relay nodes 3, 4 and 5, but it is noted that this is by way of example only. In practice there may be more or less than three relay nodes. The access system also comprises a mobility management entity (MME) 12. The mobile management entity 12 and the base station node 2 can be connected, for example, by means of a S1 interface.

An appropriate mobile user device or station may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device is often called a user equipment (UE). Each mobile device 1 and base station may have one or more radio channels open at the same time and may receive signals from more than one source.

Figure 2:
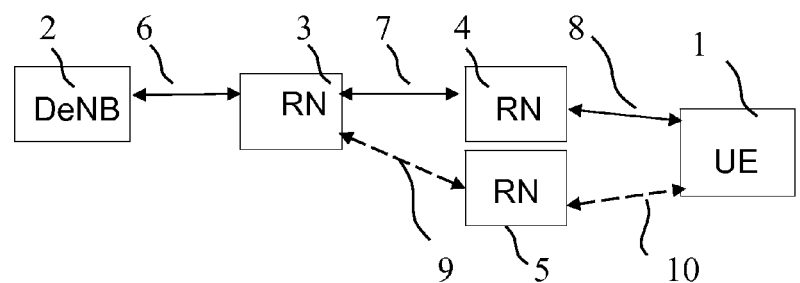
FIG. 2 shows the interfaces between a base station, relay nodes and a mobile device.

FIG. 1 example shows two different types of base stations. Base station 2 provides a base station of a cellular system whereas base stations 3, 4 and 5 may also provide relaying nodes. In relaying a relay node (RN) is wirelessly connected to the radio-access network via a donor cell, i.e. base station 2 of FIG. 1. The basic principle of relaying is shown in FIG. 2. Relay nodes may be used for example in block of flats and other buildings, offices, warehouses and/or factories and/or in public places, for example in shopping malls, sports or exhibition halls or arenas, particular areas of cities, on moving platforms such as trains, ships, aeroplanes and so on.

FIG. 2 shows communication interfaces in a relay arrangement. The wireless interface 8 between user equipment 1 and a relay node 4 and/or 5 can be provided, for example, by an Uu interface. The wireless interface 6 between the relay node 3 and the donor base station 2 can be provided by an Un interface. The link 6 between a relay node and donor base station is often called a backhaul link.

Each of the relay nodes has a coverage area associated therewith. The coverage area may be smaller than the cell of the base station 2, of a similar size to the cell or larger than the cell. A relay link known as backhaul can be provided between each relay node and the base station. The user equipment 1 in the cell is able to communicate directly with the base station 2 or with the base station via a respective relay node depending on the location of the user equipment. In particular, if the user equipment is in the coverage area associated with a relay node, the user equipment may communicate with the relay.

By way of example only it is noted that the local nodes can in certain applications have lower transmission power compared to macro NodeBs or eNBs and cheaper RF components such as oscillators and filters, due to relaxed requirements in standards. For example, the transmission power can be about 100 times lower compared to the transmission power of an eNB and frequency stability requirements can be between the requirements of an eNB and a user equipment. The transmission and reception range for the local nodes may be adapted to small range scenarios. The local access nodes, such as access nodes 2 to 4 of FIG. 1, can thus be relatively low power nodes that may be deployed to provide enhanced indoor coverage, additional capacity at hotspots or cell edge regions. For example, in the case of indoor deployment, such an access point or node may be provided for example in apartment blocks or office buildings and hence there may be a relatively high density of such access nodes. This in turn may result to need of frequent handovers between the local access nodes.

Although not shown, a gateway function between the access systems, a core network 22 and/or another network such as the packet data network may also be provided by means of appropriate gateway nodes. Regardless of the gateway arrangement, a communication device can be connected to an external data network, for example the internet via the access nodes and the base station.

Figure 3:
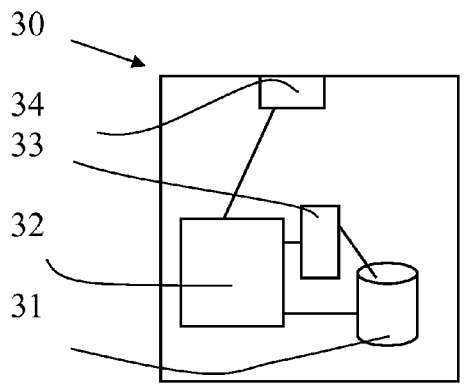
FIG. 3 shows an example of a control apparatus.

A base station is typically controlled by at least one appropriate controller apparatus. FIG. 3 shows an example for a controller apparatus 30 for a relay node. The controller apparatus is typically provided with memory capacity and at least one data processor. FIG. 3 thus shows at least one memory 31, at least one data processing unit 32 and an input/output interface 34. The control apparatus of a local access node can further comprise a mobility management block 33. The control apparatus can be configured to execute appropriate software applications to provide the desired control functions. The control apparatus, when provided in a node and comprising at least one memory and computer program code can be configured, with the at least one processor, to cause a relay node of a group of relay nodes to communicate with the access system on the behalf of another relay node of the group serving the mobile device and/or to communicate control information with other relay nodes in the group and/or maintain information about active mobile devices in the group, as will be explained in more detail below. At least some of the processing of the processing blocks may be carried out by one or more processors in conjunction with one or more memories. The processing block may be provided by an integrated circuit or a chip set. The control entity can be interconnected with other control entities.

The mobile communication devices can access the communication system based on various access techniques, such as code division multiple access (CDMA), or wideband CDMA (WCDMA), the latter technique being used by some communication systems based on the third Generation Partnership Project (3GPP) specifications. For LTE and LTE-A, OFDMA (Orthogonal Frequency Division Multiplexing) in the DL (down link) and single-carrier FDMA in the UL (uplink) can be used. Other examples include time division multiple access (TDMA), frequency division multiple access (FDMA), space division multiple access (SDMA) and so on. In a wireless system a network entity such as a base station provides an access node for communication devices.

A non-limiting example of mobile architectures where the herein described principles may be applied is known as the Evolved Universal Terrestrial Radio Access Network (E-UTRAN). Non-limiting examples of appropriate access nodes are a base station of such system, for example what is known as NodeB (NB) or enhanced NodeB (eNB) in the vocabulary of the 3GPP specifications. Other examples include base stations of systems that are based on technologies such as wireless local area network (WLAN) and/or WiMax (Worldwide Interoperability for Microwave Access). Access nodes can provide cellular system level base stations providing E-UTRAN features such as user plane Radio Link Control/Medium Access Control/Physical layer protocol (RLC/MAC/PHY) and control plane Radio Resource Control (RRC) protocol terminations towards mobile communication devices.

Figure 4:
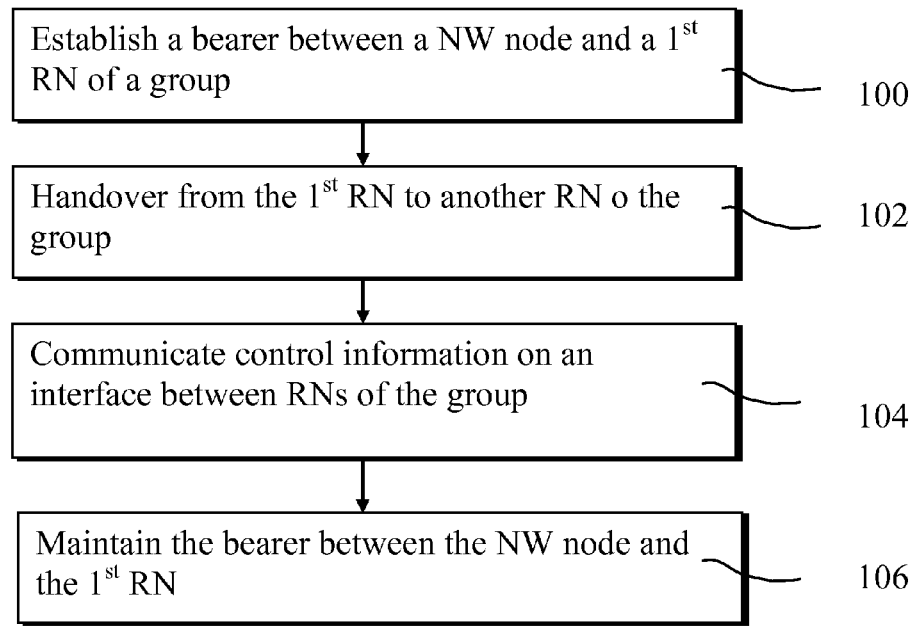
FIG. 4 is a flowchart in accordance with an embodiment.

A method for relaying communications between a mobile device and a network access node in accordance with an embodiment is shown in FIG. 4. In the method a connection is established at 100 between a first relay node of a group of relay nodes and the network access node. For example, a mobile device may be handed over to the first relay node, or a new connection may be set up. There is then a change in the relay node serving the mobile device. For example, the mobile device is handed over within the group to a second relay node at 102. Control information by at least one of the relay nodes can be communicated at 104 on an interface between relevant relay nodes in the group to maintain the relayed communications for the mobile device after the change in the serving relay node. By means of this the group continues to serve the mobile device by means of the two relay nodes at 106 such that the mobile device remains connected to the network access node via the first relay node. This can be provided regardless which other relay node of the group is serving the mobile device at this stage.

In a more detailed embodiment, a relay system based on a cooperative cell group (CCG) 14 of relay nodes (RN) is arranged to be connected and relayed to a donor base station. The cooperative relay system is a smart cooperative relay system that is based on the notion of having a close group of relay nodes. The group 14 comprises the interconnected relay nodes 3, 4 and 5. Wireless links can be provided between the base station 2 and each relay node 3 to 5.

The relays may be inter-connected with a relay node to relay node (RN-RN) cooperative interface. This interface may be realized using either a wire-line interface (for example such as the X2 interface or a similar interface) or a wireless interface. The wireless interface can be arranged to operate on a different spectrum band than that of the donor cellular system (out of band) to avoid interference. A part of the relay node to relay node (RN-RN) link can be used for the normal cooperative functions such as cooperative multiple input multiple output (MIMO), network coding, and do on. The link can also be used to other purposes such as load balancing, signalling cell changes, notifications, warnings, and so on.

A principle of the co-operative relays is to explore and utilize different diversities such as notable time-space and user diversities associated with the close cooperative group of relay nodes or cooperative cell group (CCG). The close group can be employed in different deployment scenarios in order to improve radio resource utilization on the wireless backhaul for better or more optimized network operation and performance. A relay node connected to the donor base station can act as anchor point. Internal and to the donor system opaque mobility management can be used for optimizing inter-relay node handover.

In the cooperative group shown in FIGS. 1 and 2, a first relay node 3 is connected to a second relay node 4. The second relay node 4 then has a connection (shown as solid line) 8 with the mobile device 1. Should a need for handover arise, the mobile device can be handed over to a third relay node 5, this wireless connection 10 being shown by a dashed line. The first relay node 3 and the third relay node 5 can then be in direct communication over a RN-RN link, as shown by the dashed line 9. Alternatively, the first relay node 3 may be connected to the third relay node 5 via the second relay node 4 over two RN-RN links.

In a close group the interconnected relay nodes can share relay-link or wireless backhaul capacity in an efficient, coordinated and controlled manner. The relay nodes can be connected and relayed to the same or different neighboring donor base station. Such an arrangement may be used for example where a plurality of relay nodes is provided to enhance cellular coverage and/or in embodiments that relate to relay-enhanced cellular networks, for example 3GPP LTE-A Release 10 and beyond enabled systems.

Figure 5:
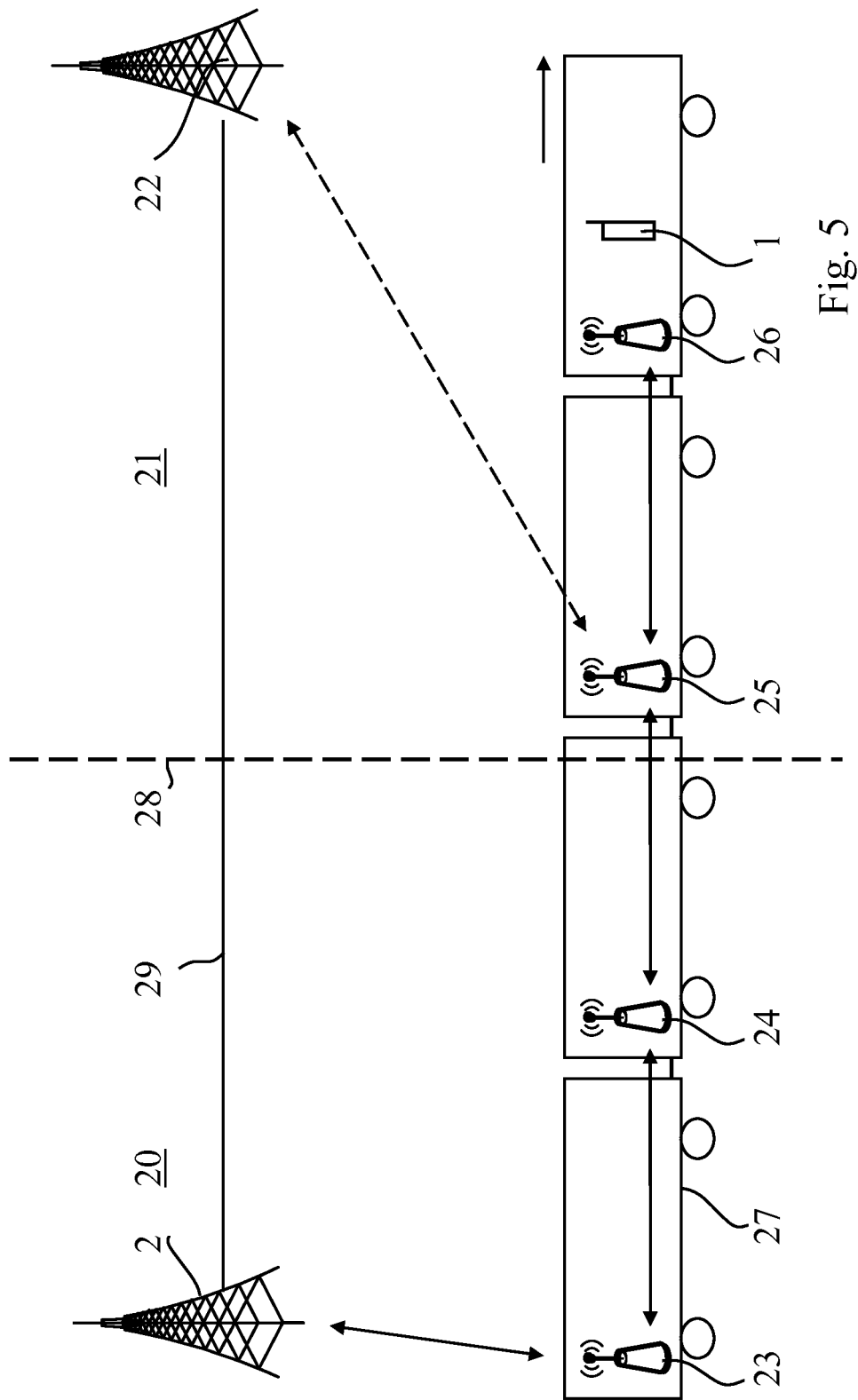
FIG. 5 shows a moving group of relay nodes.

In accordance with an embodiment efficient mobility management of active user equipments moving inside the coverage of a co-operative cell group (CCG) is provided. Such a group can be provided, for example, inside an office building or on board of a passenger train or cruise ship covered by co-operative cell group service area. An example where a moving group is provided on a train is shown in FIG. 5.

A cooperative-relay interface between the relay nodes inside the co-operative cell group can be used to enable further enhancement and optimization for the connection mobility management of active user equipments moving inside a relay node group coverage area. The mobility management can include inter-cell handover (HO) procedure between neighboring relay node cells of the co-operative cell group. A non-limiting example of the interface that can be used for this purpose is Cooperative Relay X2 interface (crX2) between the relay nodes.

An enhanced radio-link mobility management for active user equipments moving inside coverage of a group of relay nodes, for example a CCG, can be provided such that the connection mobility management of the moving user equipments involved in a handover between the relay nodes of the group is hidden from the donor access system. The user context and/or involved relay node context in base station 2 is not necessarily updated due to inter-relay node handover inside the coverage of the group. That is, neither the donor base station 2 nor the mobile management entity (MME) 12 is necessarily informed of the handover. Instead, the relevant relay nodes in the group can be made responsible for handling layer 2 (L2) radio-link level handover control. The embodiment can be used to provide a seamless radio-access link to an active user equipment as the user equipment moves from one relay node to another relay node within the coverage of a group.

The termination point of the backhauling connection 6 including S1 connection of an active user equipment can remain unchanged as long as the active user equipment is moving inside the coverage of the group. The termination point can comprise the first-source or initial relay node 3 to which the user equipment 1 first got connected. The user equipment may have become active from idle state or may have been handed over to the initial relay node from outside of the group.

The access network side of the connection can consider the initial relay node 3 as the corresponding termination point of the backhauling connection for the user equipment as long as the user equipment moves inside the coverage of the group. Thus, the backhauling-connection context of the user equipment including for example relayed evolved packet system (EPS) bearer contexts over the S1 interface via donor base station 2 can be maintained at the initial relay node 3. The context may be maintained as it is or with an update and/or modification. The context is released from the initial relay node 3 only when the user equipment 1 is handed over to a cell outside of the group, or the connection is terminated e.g. by the user.

The user equipment, as it is moving inside the coverage of the group, may be handed over from the initial relay node 3 to the second relay node 4 and from the second relay node to the third relay node 5, and so forth. In the case handover, the involved relay nodes shall transfer, map and maintain the updated user equipment contexts which are configured by the donor cellular system together with the initial relay node. To provide this the contexts of the user equipment may need to be released from the second relay node after the user equipment has been handed over to the third relay node. Upon the handover process between the second relay node and the third relay node, the second relay node may need to transfer the contexts of the user equipment to the third relay node. This transfer may include the information about the initial relay node. The third relay node may then use this information to perform a check with the initial relay node if there shall be cooperation in serving the user equipment.

In accordance with an embodiment the second relay node may also inform in advance the initial relay node of the handover of the user equipment to the third relay node.

The initial relay node 3 and the current serving relay node (either 4 or 5) can co-operate to serve the user equipment. The initial relay node can thus keep track of the user equipment and assist in backhaul data forwarding using for example the crX2 interface with the current relay node.

In accordance with an embodiment the initial or first relay node 3 may initiate a handover of the backhaul connection of the user equipment 1 to another relay node in the group. This can be done regardless of which other relay node of the group is currently serving the user equipment. This handover can be hidden from the user equipment. The handover of the backhaul connection of the user equipment to another relay node may be triggered for example for load-balancing reason. For example, the initial relay node may determine from status update information received from other relay nodes of the group that there may be more sufficient backhaul resources available at another relay node to serve the backhaul connection of the user equipment. The identified relay node can be referred to as a target relay node. In this case, the initial relay node and the target relay node may communicate with each other over the interface there between and with the donor network to perform the handover. The current serving relay node of the user equipment can then be informed of the change when handover is completed. Information that the target relay node has become the new initial relay node for the user equipment can be sent from the initial relay node or the target/new first relay node or both.

FIG. 5 shows another exam1ple relating to a moving cooperative relay system. In FIG. 5 a backhaul link for a mobile user equipment 1 is initially established between a base station 2 and an initial relay node 23 of a moving group of relay nodes 23 to 26. Relay node 26 of the group is shown to serve the mobile user equipment 1. As the train 27 moves a need may arise to change the role of the first relay node of the group to another node. FIG. 5 shows that the train 27 is moving from cell 20 to cell 21 provided by a second base station 22. Thus the moving group may need to be handed over from the original donor base station 2 to a new donor base station 22 as the train 27 moves across the cells. It is noted that although FIG. 5 shown a scenario where the user equipment crosses the cell border 28 and that the moving group moves to the area of a different cell, this is an example only and different scenarios are also possible.

In this example the user equipment 1 served by the relay node 26 is initially connected via the first relay node 23 to the first base station 2. The backhaul is handed over from the first base station 2 to the second base station 22. At the same time the role of the first relay node of the group is handed over to relay node 25 within the cell area of base station 22. As a result, the backhaul link is now between the base station 22 and relay node 25, as shown by the dashed double ended arrow. However, the user equipment 1 is still served by the same relay node 26 as before.

In accordance with a possibility the role of the first relay node is not changed but it remains with relay node 23. In this case the second base station 22 can consider the user equipment 1 as being served by the initial first relay node, and does not necessarily become aware of the identity of the relay node 26 actually serving the user equipment.

The handover between the base stations 2 and 22 as such can occur in the usual manner, for example via the X2 interface 29. This interface may be a wired or wireless connection. This handover may be hidden from the user equipment.

In accordance with an embodiment a donor cellular system considers the group of relay nodes as a unified relay system or a network entity. To enable this a common group identity can be used. Information regarding active mobile user equipments is maintained in the group, in one or more of the relay nodes thereof. For example, a common database of active user equipments being served by the group can be updated and shared among the individual relay nodes in the group. Then, a backhaul connection of each active user equipment in the group is logically established between the donor base station and the group, and not to any particular relay node. Data traffic or backhaul bearer service of each active user equipment, originated or terminated at the current serving relay node, may be scheduled and transmitted via any suitable relay node from/to the donor base station. The relay nodes in the group can determine within the group based on the database which one of the relay nodes shall be connected to the donor base station.

According to an embodiment the donor system can decide and coordinate handover of the backhaul link. For example, each member of the group can be connected to a donor base station and thus be provided with a wireless backhaul link. Then, the donor base station may coordinate pooling and sharing of backhaul capacity across all the backhaul links of the individual relay nodes of the group. The donor base station may schedule the individual relay nodes to transmit or receive on their backhaul links. However, the scheduling can be provided for the group as a whole based on the common identity. For example, a first relay node of a group can be determined as having the best backhaul link at a given moment and is scheduled to transmit to the donor base station. The relay node, however, may not have enough user data of its own to send, and therefore it may assist a second relay node of the group to send additional data. In this case, the two relay nodes need to communicate for arranging this. In the downlink, the donor base station may also determine and send to the not only the data of the users served by the first relay node but also of users served by any other relay node. In this case, the first relay node needs to decode and forward the data to the relevant other relay nodes.

In accordance with an embodiment relevant identities of user equipment contexts including evolved packet system (EPS) bearer contexts of active user equipments (such as S1X2 tunnel ID, radio network temporary identity (RNTI)) in a group are configured to be unique among the user equipments across the group, and not just unique among user equipments within a relay node cell. This can be provided for example by using implicit relay node binding IDs among relay nodes of the group or by applying direct user equipment multiplexing and de-multiplexing at individual cooperative relay nodes. This can in turn reduce overhead over the RN-RN interface and backhauling connection via the base station.

A close cooperative group may be assigned a unique identifier. For example, the group may be addressed with a unique group radio network temporary identity (RNTI) common to all members of the group. Thus an individual member can be configured with an individual RNTI and a group RNTI. The group RNTI can then be used for common control and data forwarding purposes by the donor base station and/or the relay node where the individual RNTI can be used within the group.

The embodiments may provide a simple and effective cooperative relay system to further enhance the relay deployment, network solution and system performance. The embodiments may allow more efficient use of resources since it is possible to avoid for example handover procedures such as those in accordance with LTE release 8 for handover between two neighboring relay nodes and thus less signaling for data and context exchanges and/or connection and bearer setup between the involved relay nodes, donor base stations and mobility management entities MME(s) may be required.

The required data processing apparatus and functions of a base station apparatus as well as appropriate communication devices may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor-based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for managing inter-group handovers and controlling communications between the relay nodes and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to LTE, similar principles can be applied to any other wireless communication system to support uncoordinated local area deployments. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:

1. A method for relaying communications between a mobile device and a network access node, comprising:
   establishing a connection between a first relay node of a group of relay nodes and the network access node, the first relay node serving the mobile device;
   performing an intra-group handover of the mobile device from the first relay node to a second relay node of the group, the intra-group handover being controlled by a mobility management system internal to the group such that the mobile device remains connected to the network access node via one of the first and second relay nodes during the intra-group handover; and
   communicating control information between said relay nodes on an interface between relevant relay nodes in the group for the intra-group handover to maintain the relayed communications for the mobile device after the intra-group handover between the relay nodes.

2. A method according to claim 1, wherein the mobility management system for the mobile device within the group of relay nodes is provided independently from mobility management control by the network.

3. A method according to claim 1, wherein the intra-group handover comprises inter-cell handover of the mobile device between neighboring relay node cells of a co-operative cell group.

4. A method according to claim 1, wherein the intra-croup handover is hidden from the network access node.

5. A method according to claim 4, wherein said control information comprises information of the context configured by the network for the mobile device.

6. A method according to claim 1, comprising providing layer 2 radio-link level handover control by the mobility management system of the group.

7. A method according to claim 1, comprising maintaining the termination point of a backhauling link between an initial relay node of the group and the network access node at the initial relay node when the intra-group handover takes place.

8. A method according to claim 1, wherein the control information comprises an identity for the first relay node.

9. A method according to claim 1, wherein the establishing comprises configuring a bearer context for the mobile device, and the relevant relay nodes transfer, map and maintain the bearer context in association with the intra-group handover.

10. A method according to claim 1, comprising sending a message to the first relay node from the second relay node regarding the intra-group handover of the mobile device.

11. A method according to claim 1, comprising coordinating the control of the mobile device in the group of relay nodes by a relay node maintaining the termination point of a backhauling link between the network access node and the group.

12. A method according to claim 1, comprising providing unique identities for the bearer context of the mobile device in the group.

13. A method according to claim 1, comprising providing an identity for the group and addressing the group as a whole based on the identity.

14. A method according to claim 1, comprising maintaining a record of active mobile devices in relevant relay nodes of the group.

15. A method according to claim 1, comprising handover of a backhauling link for the mobile device from a relay node of the group to another relay node of the group, the handover being triggered for load-balancing reasons.

16. An apparatus for a relay node in communication system where communications between a mobile device and a network access node is relayed by at least two relay nodes of a group of relay nodes, the apparatus comprising:
   at least one processor, and
   at least one memory including computer program code, wherein the at least one memory and the computer program code are configured, with the at least one processor, to provide mobility management for controlling an intra-group handover of the mobile device from a first relay node of the at least two relay nodes to a second relay node of the at least two relay nodes, such that the mobile device remains connected to the network access node via one of the first relay node and the second relay node during the handover, wherein control information is communicated between said first and second relay nodes on an interface between relevant relay nodes in the group of relay nodes for the intra-group handover to maintain the relayed communication for the mobile device after the intra-group handover between the relay nodes.

17. An apparatus according to claim 16, wherein the intra-group handover is hidden from the network access node.

18. An apparatus according to claim 16, wherein the apparatus is configured to generate control information and cause communication of the control information in the group to maintain the relayed connection between the mobile device and the network access node.

19. An apparatus according to claim 16, wherein the apparatus is configured to provide mobility management for controlling an intra-group handover of the mobile device, independently of mobility management control by the network.

20. An apparatus according to claim 16, wherein the apparatus is configured to provide layer 2 radio-link level handover control.

21. An apparatus according to claim 16, wherein the apparatus is configured to maintain the termination point of a backhauling link between the first relay node and the network access node at the first relay node after the intra-group handover between the relay nodes.

22. An apparatus according to claim 16, wherein the apparatus is configured to control transfer, mapping and maintaining of a bearer context in association with the intra-group handover.

23. An apparatus according to claim 16, wherein the apparatus is configured to use unique identities for bearer contexts in the group.

24. An apparatus according to claim 16, wherein the apparatus is configured to use an identifier for the group as a whole.

25. An apparatus according to claim 16, wherein the apparatus is configured to maintain a record of active mobile devices in the group.

26. A base station comprising the apparatus of claim 16.

27. A communication system comprising the apparatus in accordance with claim 16.

28. A computer program product comprising a non-transitory computer readable medium with program code stored thereon, which when executed by an apparatus causes the apparatus to perform:
   establishing a connection between a first relay node of a group of relay nodes and the network access node, the first relay node serving to serve the mobile device;
   performing an intra-group handover of the mobile device from the first relay node to a second relay node of the group, the Intra-group handover being controlled by a mobility management system internal to the group such that the mobile device remains connected to the network access node via one of the first and second relay nodes during the intra-group handover; and
   communicating control information between said relay nodes on an interface between relevant relay nodes in the group for the intra-group handover to maintain the relayed communications for the mobile device after the intra-group handover between the relay nodes.

* * * * *